3,315,307
PLASTIC EXTRUSION APPARATUS
Richard Walter Hurd, Newburgh, and James Scott McDaniel, Snyder, N.Y., and Donald Ross McGregor, New Providence, N.J., assignors to E. I. du Pont de Nemours and Company, Wilmington, Del., a corporation of Delaware
Filed July 19, 1965, Ser. No. 472,883
3 Claims. (Cl. 18—14)

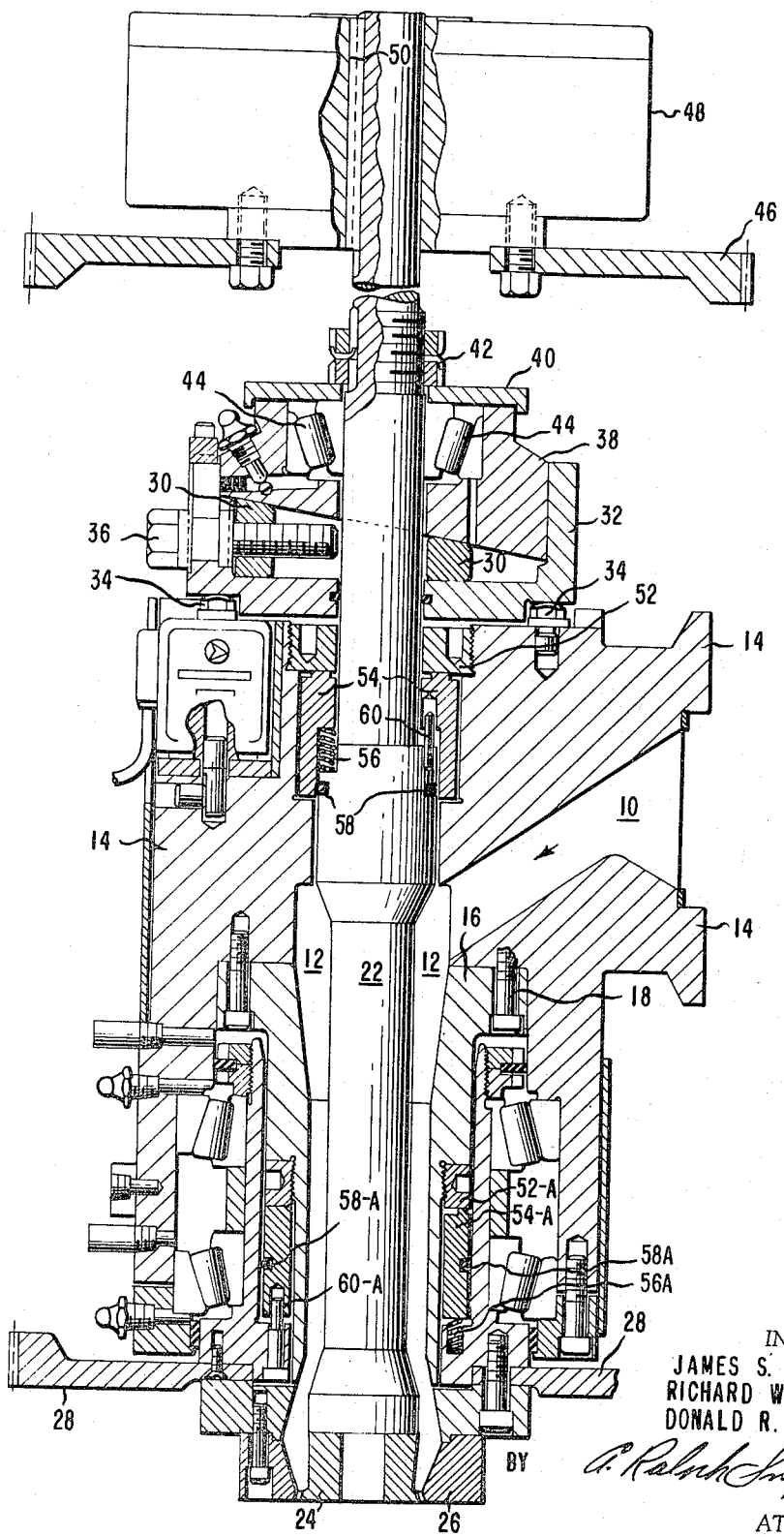

This invention relates to an apparatus for polymer extrusion. More particularly, it relates to an extrusion apparatus for supplying pressurized fluent thermoplastic material under equalized pressure to rotary and adjustible die members.

It is desirable in polymeric extrusion to extrude plastic at high rates; however, when the extrusion pressure is increased to force the polymer through a rotating die at a faster rate, conventional rotating extrusion equipment often develops excessive polymer leakage. Moreover, prolonged use of rotating dies which employ rubbing die lips results in die lip wear necessitating an inconvenient shut-down to replace the dies.

Correspondingly, it is an object of this invention to provide a rotating extrusion assembly in which the die lips can be adjusted to compensate for wear while maintaining operation of the extruder. It is another object of this invention to provide novel seal means to prevent polymer leakage when the extrusion apparatus is operated at high extrusion pressures. Another object of the invention is to provide a means for equalizing the pressure of the polymer within the polymer channel of the apparatus to lengthen seal and die lip life and simplify die adjustment. These and other objects will become apparent hereinafter.

In a typical extruder, molten polymer is fed under pressure into an extrusion supply chamber within the die, and is then forced through the chamber to the die lip orifices. The inner die lip ordinarily rotates by the action of a shaft which extends through the length of the extrusion supply chamber. Ordinarily the polymer channel to the orifices extends divergently outward since the die lips are usually larger in diameter than a suitable shaft. Thus, the pressure of the polymer tends to force the inner die lip outwardly from the extrusion assembly stretching the shaft and, causing polymer leakage at the rubbing faces of the die lips. The die lips then must be repositioned which until now required stopping extrusion. The inaccuracy of adjustment at zero pressure resulted in excessive die lip wear. It is a novel feature of this invention to construct the rotating shaft such that the pressure of the polymer creates an opposing force to counteract the force on the inner die lip. This is accomplished by reducing the diameter of the shaft in a gradual taper at the point where the polymer inflow channel enters the supply chamber. The circumferential surface of the shaft in this region is oblique to the axis of the shaft, and as the polymer contacts the oblique surface, a thrust force is created to offset the thrust force exerted by the polymer on the inner die lip at the extrusion end thereby reducing the thrust on the shaft adjustment mechanism facilitating die lip adjustment.

It is another novel feature of this invention to provide a shaft adjustment means whereby the die lips can be adjusted to compensate for wear without shutting down in the extrusion assembly. This means comprises a wedge assembly or inclined plane adjusting mechanism which operates on the shaft to control the clearance between the die lips. With these two features die lips can be adjusted so accurately that die lip wear is reduced to a very low level.

Still another novel feature of this invention is the provision of metal-to-metal seals to prevent excessive polymer leakage. The seal comprises a movable seal ring bearing on a stationary seal ring with its contact or sealing force being derived from the pressurized polymer stream. An auxiliary side seal is used in conjunction with the movable seal and is of the O ring type design employing an additional back-up ring. This arrangement permits operation at seal speed and pressure combinations far above that obtainable with conventional rotary sealing means.

Thus, the objects of this invention are accomplished by providing a polymer extrusion apparatus comprising an extrusion chamber having a polymer inlet channel; a set of relatively rotatable inner and outer die lips in association with each other and in communication with said chamber so as to afford continuous extrusion through the die lips; a rotatable shaft extending through said chamber and affixed to drive said inner die lip, said shaft constructed and arranged such that the longitudinal surface is obliquely tapered in the region adjacent said inlet channel to permit the pressure of the polymer in the chamber to exert a force opposing the force created by the pressure of the polymer upon the inner die lip; means to align said inner and outer die lips comprising a wedge assembly affixed to said shaft to provide for longitudinal movement of said shaft; sealing means constructed and arranged to prevent excessive polymer leakage from the extrusion chamber around the shaft, and outer die lip support assembly comprising a stationary metal seal and a movable metal seal abutting said stationary seal; and means to rotate said shaft and said outer die assembly.

The invention will now be described in reference to the accompanying drawing, which is a vertical section elevation of the extrusion die of this invention.

Referring now to the drawing, the extrusion apparatus of this invention is provided with a polymer inlet channel 10 through which molten polymer is force fed into extrusion chamber 12. Chamber 12 is composed of casing 14 and inner fitting sleeve 16 which are rigidly held together by screws 18. The upper end of casing 14 is provided with an opening through which extends rotatable shaft 22 that rotates the inner die lip 24. The casing 14 also supports the outer die lip 26 which is rotated by spur gear 28. The surface of shaft 22 which is adjacent inlet channel 10 is obliquely tapered along the longitudinal axis.

Positioned above casing 14 is a wedge assembly which allows shaft 22 to be moved longitudinally while maintaining operation of the extruder. The wedge assembly comprises an annular wedge 30 which rests upon wedge housing 32. Housing 32 is fitted upon casing 14 through spacers 34. Wedge 30 is attached to and is operated by adjusting bolt 36 extending through housing 32. Adjustment of the wedge causes wedge abutting member 38 to move. Such movement causes shaft 22 to move correspondingly through bearing cover member 40, locknut 42 and bearings 44.

Shaft 22 is rotated by spur gear 46 and clutch 48 which is attached to the shaft by keyway 50.

To prevent polymer leakage, two seal assemblies are provided. The seal assembly effecting polymer seal between shaft 22 and casing 14 comprises an upper metal seal retaining ring 52 which screws into casing 14 and movable metal seal ring 54 which is held against ring 52 by spring 56 until the operating pressure is attained. Abutting ring 54 is O-ring 58 on shaft 22. Ring 54 rotates with shaft 22 through pin 60.

The second seal is similarly constructed and effects seal between sleeve 16 and the assembly upon which outer die 26 is mounted.

By removing and exchanging the inner and outer die lips, a wide variety of films can be extruded at high speeds. For example, U.S. 3,070,840, describes inner and outer die lip combinations which will produce tubular or cylindrical plastic netting or ribbed tubular film. Still other die lip combinations which can be used with the apparatus of this invention are disclosed in U.S. 2,919,467. The tubular structures so produced can be split longitudinally into flat sheeting.

The tubular structures as extruded can be subjected to a setting treatment as by spraying with or immersing in a cooling liquid, or by subjecting it to refrigerated air or gas currents.

Any thermoplastic capable of melt or compression extrusion in a molten state through die lips and settable by a cooling medium on issuance from die lips may be employed in the apparatus of this invention. Representative thermoplastic materials suitable for use in the apparatus include polyamides; polyesters; polyvinylhalides and copolymers thereof with vinylacetate or vinylidene chloride; polyethylene; cellulose acetate; natural or synthetic rubbers, subsequently vulcanized or containing vulcanized agents; thermosetting plastic materials or mixtures thereof with thermoplastic materials which are capable of extrusion; and wet spinnable materials, such as viscose, cupra-ammonium cellulose or protein material (e.g. from soya bean), capable of extrusion and setting by immersion in or spraying with a coagulant as the plastic emerges from the die lips.

From the drawing, it is apparent that the upper seal 52 is affixed to casing 14 through external threads which engage the threaded hole in the casing. The movable metal seal 54 is driven by pin 60 which is attached to shaft 22; the movable seal 54 is free to travel vertically about 1/8 inch to permit the shaft 22 to be raised or lowered. Spring 56 maintains the seal face of seal 52 against the face of seal 54 when the pressure within the extrusion chamber approaches or equals zero. The mating surfaces of the seal rings are lapped to within two light bands at 90° to the axis within a 0.001 inch total indicated run-out. The seal is maintained while in operation by the interference at these sealing surfaces resulting from the movable seal ring 54 being forced against the stationary seal ring 52 by the pressure of the polymer in the extrusion chamber.

The seal rings are fabricated from dissimilar high strength metals. For example, alloy combinations such as "Vanadium Neatro" and modified type "135 Nitralloy" can be used. A "Viton" O ring in combination with a "Teflon" back-up ring (58) is used as a secondary seal. The lower seal is constructed similarly to the upper seal and its parts are designated by the same numbers as for the upper seal counterparts followed by the letter A.

As previously stated, the novel apparatus of this invention provides for high rate extrusion while increasing useful die-lip life. For example, when the novel apparatus of the invention was adapted for use with 2 inch and 2½ inch die lips, extrusion rates of 60–100 lbs./hour at a die chamber extrusion pressure of 700 p.s.i. (measured at the approximate center of the chamber) were obtained. In contrast, typical extrusion rates of a conventional extruder with die lips of the above size, range from 30–50 lbs./hour; and the pressure within the extrusion chamber of a typical conventional extruder is about 1700 p.s.i. In addition, the die lip life of the extruder apparatus of this invention was approximately doubled over the die life of a conventional extruder.

As many apparently widely different embodiments of this invention may be made without departing from the spirit and scope thereof, it is to be understood that this invention is not limited to the specific embodiments thereof except as defined in the appended claims.

The embodiments of the invention in which the exclusive property or privilege is claimed are defined as follows:

1. An apparatus for continuously extruding a polymer comprising, in combination;
   (1) an extrusion chamber having a polymer inlet channel;
   (2) a set of relatively rotatable inner and outer die members in association with each other and in communication with said chamber to afford continuous extrusion through the die members;
   (3) a rotatable shaft extending through said chamber affixed to drive said inner die member, said shaft constructed and arranged such that the longitudinal surface is obliquely tapered in the region adjacent said inlet channel to permit pressure of the polymer to exert a force opposing the force created by the pressure of the polymer upon the inner die member;
   (4) means to adjust the clearance between said inner and outer die members comprising a wedge assembly affixed to said inner die shaft to provide for longitudinal movement of said shaft and inner die member.
   (5) sealing means constructed and arranged to prevent excessive polymer leakage from the extrusion chamber into the clearance regions separating the rotating inner die shaft from the die housing and the rotating outer die support from the die housing comprising a stationary metal seal and an abutting movable metal seal; and
   (6) means to rotate said shaft and said outer die member.

2. The apparatus of claim 1 wherein said means to adjust the clearance between said inner and outer die members while extruding comprises, and adjusting means to adjust said wedge, and an abutting member affixed to said shaft and mounted to abut said wedge.

3. In an apparatus for the continuous extrusion of polymer under pressure comprising a rotatable inner die affixed to the lower end of a driven shaft having a flared section at said lower end, an outer die, a housing for the inner die, the outer die, and the shaft affording an enclosed extrusion chamber, and an inlet port to the chamber; the improvement comprising providing the shaft at its upper end within the chamber with an additional flared section presenting a surface opposed to the surface of the flared section at the lower end of said shaft whereby as the polymer in the chamber contacts the surface of the flared portion at the upper end of said shaft an upward thrust force thereon is created to offset the downward thrust force exerted by the polymer on the flared section at the lower end of said shaft.

References Cited by the Examiner

UNITED STATES PATENTS 2,204,151  6/1940  Rodefer et al.
2,342,769  2/1944  Suchman.

(Other references on following page)

UNITED STATES PATENTS

| | | | |
|---|---|---|---|
| 2,566,846 | 9/1951 | Martin | 18—13 |
| 2,644,983 | 7/1953 | Curtiss | 18—13 XR |
| 2,720,837 | 11/1956 | Reifenhauser | 18—12 |
| 2,779,970 | 2/1957 | Stocker. | |
| 2,896,253 | 7/1959 | Moe | 18—12 |
| 2,944,286 | 7/1960 | Kullgren et al. | 18—12 |
| 2,963,740 | 12/1960 | Yim. | |
| 3,020,588 | 2/1962 | Ferguson et al. | |
| 3,102,694 | 9/1963 | Frenkel. | |
| 3,199,145 | 10/1965 | Tiemersma | 18—12 |
| 3,221,372 | 12/1965 | Lieberman | 18—13 |

References Cited by the Applicant

UNITED STATES PATENTS

| | | |
|---|---|---|
| 2,919,467 | 1/1960 | Mercer. |
| 3,051,987 | 9/1962 | Mercer. |
| 3,067,084 | 12/1962 | Nalle. |
| 3,070,840 | 1/1963 | Mercer. |
| 3,123,512 | 3/1964 | Mercer. |

FOREIGN PATENTS

| | | |
|---|---|---|
| 887,283 | 2/1962 | Great Britain. |

WILLIAM J. STEPHENSON, *Primary Examiner.*